(12) United States Patent
Lee et al.

(10) Patent No.: US 11,372,457 B1
(45) Date of Patent: Jun. 28, 2022

(54) TOUCHPAD MODULE AND COMPUTING DEVICE USING SAME

(71) Applicant: Primax Electronics Ltd., Taipei (TW)

(72) Inventors: Chao-Wei Lee, Taipei (TW); Wei-Chiang Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/240,248

(22) Filed: Apr. 26, 2021

(30) Foreign Application Priority Data

Mar. 11, 2021 (TW) .................................. 110108631

(51) Int. Cl.
*G06F 3/0354* (2013.01)
*G06F 1/16* (2006.01)

(52) U.S. Cl.
CPC .......... *G06F 1/169* (2013.01); *G06F 3/03547* (2013.01)

(58) Field of Classification Search
CPC ............................. G06F 1/169; G06F 3/03547
See application file for complete search history.

(56) References Cited

U.S. PATENT DOCUMENTS

| 10,921,865 | B2* | 2/2021 | Huang | G06F 3/03547 |
| 2017/0017266 | A1* | 1/2017 | Kitamura | G06F 1/1616 |
| 2017/0024029 | A1* | 1/2017 | Kitamura | G06F 1/169 |
| 2017/0140883 | A1* | 5/2017 | Kitamura | H01H 13/10 |

\* cited by examiner

*Primary Examiner* — Carolyn R Edwards
(74) *Attorney, Agent, or Firm* — Kirton McConkie; Evan R. Witt

(57) ABSTRACT

A touchpad module includes a base plate, a touch member, a switch, an elastic element, a first supporting element and a second supporting element. The base plate includes a triggering part. The touch member is located over the base plate. The switch is disposed on the touch member and aligned with the triggering part. The elastic element is located under the base plate. The elastic element includes a fixed part, a first swingable part and a second swingable part. The fixed part is fixed on the base plate. The first swingable part includes a first contact structure. The second swingable part includes a second contact structure. When an external force is exerted on the touch member, the touch member is swung toward the base plate relative to the first supporting element, and the second swingable part is swung away from the base plate.

17 Claims, 15 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in the casing 21 of the notebook computer 2. The touchpad module 1 is installed within the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 can be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

Generally, the supporting structure 11 is connected with the upper component and the lower component through iron elements or plastic structures (e.g., sponge structures). Consequently, as the iron elements or the plastic structures are subjected to deformation, the touch member 13 can be swung upwardly or downwardly. However, the conventional touchpad module 10 still has some drawbacks. For example, the position of the touch member 13 that is aligned with the supporting structure 11 cannot be pressed down, but only the position of the touch member 13 that is not aligned with the supporting structure 11 can be pressed down. In other words, the touch member 13 of the touchpad module 10 can be locally pressed down. Due to the structural design of the touchpad module 10, it is unable to press down the whole surface of the touch member 13.

Therefore, there is a need of providing an improved touchpad module in order to overcome the above drawbacks.

SUMMARY OF THE INVENTION

An object of the present invention provides a touchpad module. The whole region of a touch member of the touchpad module can be pressed down. Consequently, the problem of locally pressing the touch member of the conventional touchpad module can be overcome.

Another object of the present invention provides a computing device with a touchpad module. The whole region of a touch member of the touchpad module can be pressed down. Consequently, the problem of locally pressing the touch member of the conventional touchpad module can be overcome.

The other objects and advantages of the present invention will be understood from the disclosed technical features.

In accordance with an aspect of the present invention, a touchpad module for a computing device is provided. The touchpad module is installed within a fixing frame of a computing device. The touchpad module includes a base plate, a touch member, a switch, an elastic element, a first supporting element and a second supporting element. The base plate includes a triggering part. The touch member is located over the base plate. The switch is disposed on the touch member and aligned with the triggering part. The elastic element is located under the base plate. The elastic element includes a fixed part, a first swingable part and a second swingable part. The fixed part is fixed on the base plate and connected between the first swingable part and the second swingable part. The first swingable part includes at least one first contact structure. The second swingable part includes at least one second contact structure. The at least one first contact structure and the at least one second contact structure are extended in directions away from each other. The at least one first contact structure and the at least one second contact structure are contacted with the base plate. The first supporting element is installed between the touch member and the first swingable part. The second supporting element is installed between the touch member and the second swingable part. When an external force is exerted on a first region at a first side of the touch member, the touch member is swung toward the base plate by using the first supporting element as a fulcrum, so that the switch is contacted with the triggering part. While the touch member is swung toward the base plate, the second supporting element is moved downwardly to push the second swingable part, so that the second swingable part is swung away from the base plate and the at least one second contact structure is correspondingly detached from the base plate.

In an embodiment, when the external force is exerted on a second region at a second side of the touch member, the touch member is swung toward the base plate by using the second supporting element as the fulcrum, so that the switch is contacted with the triggering part. While the touch member is swung toward the base plate, the first supporting element is moved downwardly to push the first swingable part, so that the first swingable part is swung away from the base plate and the at least one first contact structure is correspondingly detached from the base plate. The first side and the second side of the touch member are two opposite sides of the touch member.

In an embodiment, when the external force is exerted on a third region of the touch member between the first region and the second region, the touch member is moved toward the base plate, so that the switch is contacted with the triggering part. While the touch member is moved toward the base plate, the first supporting element and the second supporting element are moved downwardly to push the first swingable part and the second swingable part, respectively. Consequently, the first swingable part and the second swingable part are swung away from the base plate and the at least one first contact structure and the at least one second contact structure are correspondingly detached from the base plate.

In an embodiment, the base plate includes a frame body, a first hollow portion and a second hollow portion. The first hollow portion and the second hollow portion are formed in the frame body. The triggering part is disposed on the frame body. The first supporting element is penetrated through the first hollow portion and contacted with the first swingable part of the elastic element. The second supporting element is penetrated through the second hollow portion and contacted with the second swingable part of the elastic element.

In an embodiment, the at least one first contact structure includes plural first contact structures, the at least one second contact structure includes plural second contact structures, and the frame body of the base plate has a rectangular structure. The plural first contact structures and the plural second contact structures are located under four corners of the rectangular structure, respectively.

In an embodiment, the first swingable part of the elastic element further includes a third hollow portion, the second swingable part of the elastic element further includes a fourth hollow portion, and the fixed part of the elastic element is arranged between the third hollow portion and the fourth hollow portion. The third hollow portion is in communication with the first hollow portion of the base plate. The fourth hollow portion is in communication with the second hollow portion of the base plate. The fixed part is fixed on a region of the frame body between the first hollow portion and the second hollow portion.

In an embodiment, the touch member includes a circuit board and a covering plate. The covering plate is located over the circuit board, and the switch is installed on the circuit board.

In an embodiment, the touchpad module further includes at least one fastening element. The base plate is fixed on the fixing frame through the at least one fastening element.

In accordance with another aspect of the present invention, a touchpad module for a computing device is provided. The touchpad module is installed within a fixing frame of a computing device. The touchpad module includes a base plate, a touch member, a switch, an elastic element, at least one first position-limiting element and at least one second position-limiting element. The touch member is located over the base plate. The switch is disposed on the touch member. The elastic element is arranged between the base plate and the touch member. The elastic element includes a fixed part, a first swingable part, a second swingable part and a triggering part. The fixed part is fixed on the base plate and connected between the first swingable part and the second swingable part. The first swingable part includes at least one first raised support structure. The second swingable part includes at least one second raised support structure. The touch member is supported by the at least one first raised support structure and the at least one second raised support structure. The at least one first raised support structure and the at least one second raised support structure are extended in directions away from each other and exposed outside the touch member. The triggering part is disposed on the fixed part and aligned with the switch. The at least one first position-limiting element is located at a side of the base plate. A portion of the at least one first raised support structure that is exposed outside the touch member is contacted with the corresponding first position-limiting element. The at least one second position-limiting element is located at another side of the base plate. A portion of the at least one second raised support structure that is exposed outside the touch member is contacted with the corresponding second position-limiting element. When an external force is exerted on a first region at a first side of the touch member, the touch member is swung toward the base plate by using the first raised support structure as a fulcrum, so that the switch is contacted with the triggering part. While the touch member is swung toward the base plate, the at least one second raised support structure is pushed by the touch member, and the second swingable part is swung toward the base plate. Consequently, the at least one second raised support structure is correspondingly detached from the second position-limiting element.

In an embodiment, when the external force is exerted on a second region at a second side of the touch member, the touch member is swung toward the base plate by using the second raised support structure as the fulcrum, so that the switch is contacted with the triggering part. While the touch member is swung toward the base plate, the at least one first raised support structure is pushed by the touch member, and the first swingable part is swung toward the base plate. Consequently, the at least one first raised support structure is correspondingly detached from the first position-limiting element. The first side and the second side of the touch member are two opposite sides of the touch member.

In an embodiment, when the external force is exerted on a third region of the touch member between the first region and the second region, the touch member is moved toward the base plate, so that the switch is contacted with the triggering part. While the touch member is moved toward the base plate, the first raised support structure of the first swingable part and the second raised support structure of the second swingable part are pushed by the touch member, and the first raised support structure and the second raised support structure are swung toward the base plate. Consequently, the first raised support structure and the second raised support structure are respectively detached from the first position-limiting element and the second position-limiting element.

In an embodiment, the first raised support structure of the first swingable part is raised toward the touch member, so that a first surface of the first raised support structure is contacted with the touch member. The second raised support structure of the second swingable part is raised toward the touch member, so that a second surface of the second raised support structure is contacted with the touch member. A third surface of the fixed part faces the touch member. The first surface and the third surface are located at different horizontal planes. The second surface and the third surface are located at different horizontal planes.

In an embodiment, the base plate includes a frame body, a first hollow portion and a second hollow portion. The first hollow portion and the second hollow portion are formed in the frame body. The first swingable part of the elastic element is included in an orthographic projection region of the first hollow portion that faces the first swingable part. The second swingable part of the elastic element is included in an orthographic projection region of the second hollow portion that faces the second swingable part. The fixed part is fixed on a region of the frame body between the first hollow portion and the second hollow portion.

In an embodiment, the at least one first raised support structure includes plural first raised support structures, the at least one second raised support structure includes plural second raised support structures, and the frame body of the base plate has a rectangular structure. The plural first raised support structures and the plural second raised support structures are located under four corners of the rectangular structure, respectively.

In an embodiment, the at least one first position-limiting element includes plural first position-limiting elements, the at least one second position-limiting element includes plural second position-limiting elements, and the plural first position-limiting elements and the plural second position-limiting elements are located under four corners of the rectangular structure, respectively.

In accordance with another aspect of the present invention, a computing device is provided. The computing device includes a casing, a processor and a touchpad module. The fixing frame is concavely formed in the casing. The processor is disposed within the casing. The touchpad module is disposed within the casing and electrically connected with the processor. The touchpad module is installed within a fixing frame of a computing device. The touchpad module includes a base plate, a touch member, a switch, an elastic element, a first supporting element and a second supporting element. The base plate includes a triggering part. The touch member is located over the base plate. The switch is disposed on the touch member and aligned with the triggering part. The elastic element is located under the base plate. The elastic element includes a fixed part, a first swingable part and a second swingable part. The fixed part is fixed on the base plate and connected between the first swingable part and the second swingable part. The first swingable part includes at least one first contact structure. The second swingable part includes at least one second contact structure. The at least one first contact structure and the at least one second contact structure are extended in directions away from each other. The at least one first contact structure and the at least one second contact structure are contacted with the base plate. The first supporting element is installed between the touch member and the first swingable part. The second supporting element is installed between the touch member and the second swingable part. When an external force is exerted on a first region at a first side of the touch member, the touch member is swung toward the base plate by using the first supporting element as a fulcrum, so that the switch is contacted with the triggering part. While the touch member is swung toward the base plate, the second supporting element is moved downwardly to push the second swingable part, so that the second swingable part is swung away from the base plate and the at least one second contact structure is correspondingly detached from the base plate.

In accordance with another aspect of the present invention, a computing device is provided. The computing device includes a casing, a processor and a touchpad module. The fixing frame is concavely formed in the casing. The processor is disposed within the casing. The touchpad module is disposed within the casing and electrically connected with the processor. The touchpad module is installed within a fixing frame of a computing device. The touchpad module includes a base plate, a touch member, a switch, an elastic element, at least one first position-limiting element and at least one second position-limiting element. The touch member is located over the base plate. The switch is disposed on the touch member. The elastic element is arranged between the base plate and the touch member. The elastic element includes a fixed part, a first swingable part, a second swingable part and a triggering part. The fixed part is fixed on the base plate and connected between the first swingable part and the second swingable part. The first swingable part includes at least one first raised support structure. The second swingable part includes at least one second raised support structure. The touch member is supported by the at least one first raised support structure and the at least one second raised support structure. The at least one first raised support structure and the at least one second raised support structure are extended in directions away from each other and exposed outside the touch member. The triggering part is disposed on the fixed part and aligned with the switch. The at least one first position-limiting element is located at a side of the base plate. A portion of the at least one first raised support structure that is exposed outside the touch member is contacted with the corresponding first position-limiting element. The at least one second position-limiting element is located at another side of the base plate. A portion of the at least one second raised support structure that is exposed outside the touch member is contacted with the corresponding second position-limiting element. When an external force is exerted on a first region at a first side of the touch member, the touch member is swung toward the base plate by using the first raised support structure as a fulcrum, so that the switch is contacted with the triggering part. While the touch member is swung toward the base plate, the at least one second raised support structure is pushed by the touch member, and the second swingable part is swung toward the base plate. Consequently, the at least one second raised support structure is correspondingly detached from the second position-limiting element.

From the above descriptions, the structure of the touchpad module is specially designed. The whole region of the touch member of the touchpad module can be pressed down. Consequently, the problem of locally pressing the touch member of the conventional touchpad module can be overcome. Moreover, since the structural design of the touchpad module is simplified, the fabricating cost and the overall weight of the touchpad module are reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
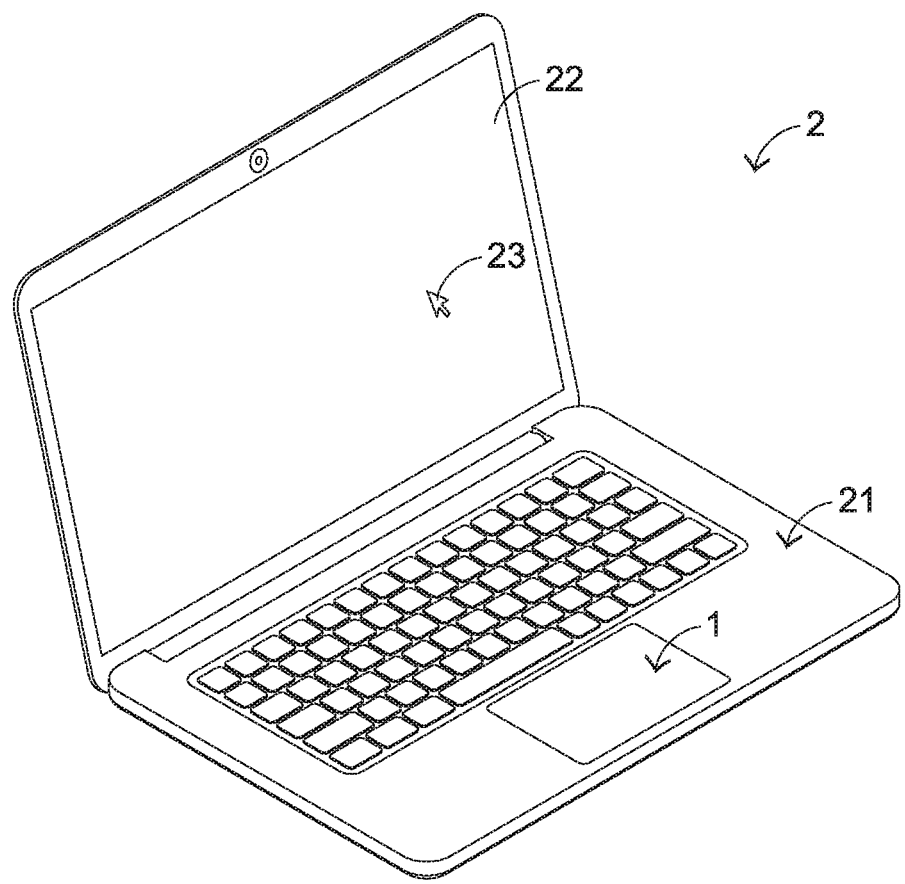
FIG. 1 schematically illustrates a conventional notebook computer with a touchpad module.
Figure 2:
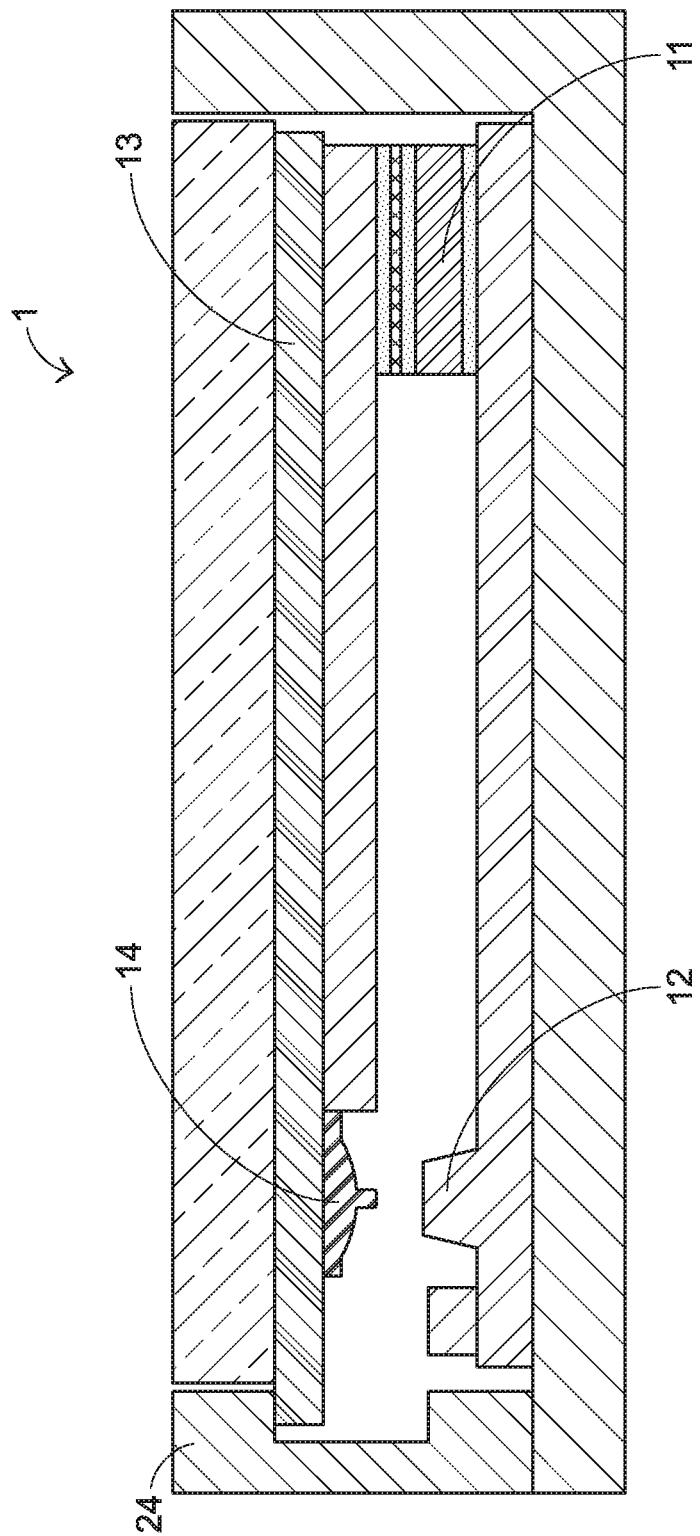
FIG. 2 is a schematic cross-sectional view illustrating the touchpad module as shown in FIG. 1, in which the touchpad module is not pressed down.
Figure 3:
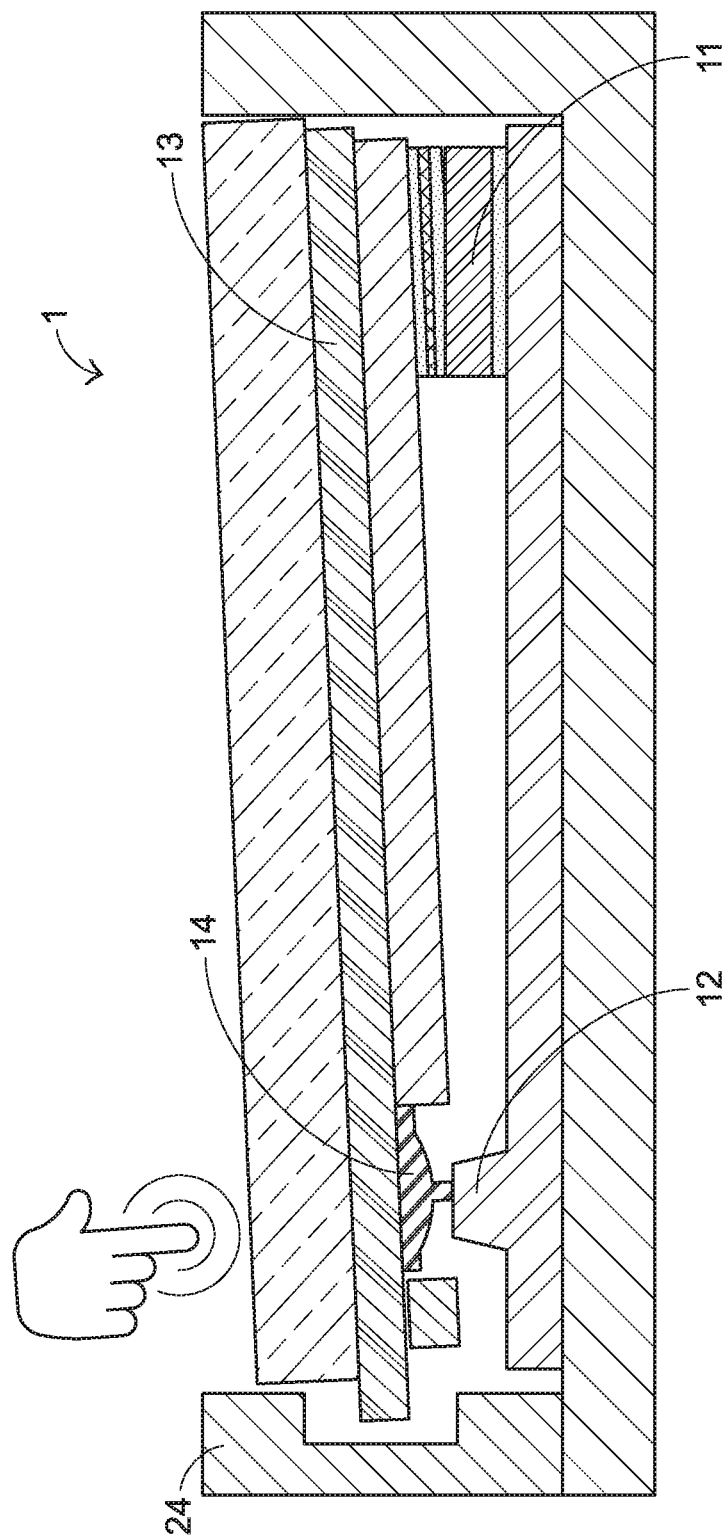
FIG. 3 is a schematic cross-sectional view illustrating the touchpad module as shown in FIG. 2, in which the touchpad module is pressed down.
Figure 4:
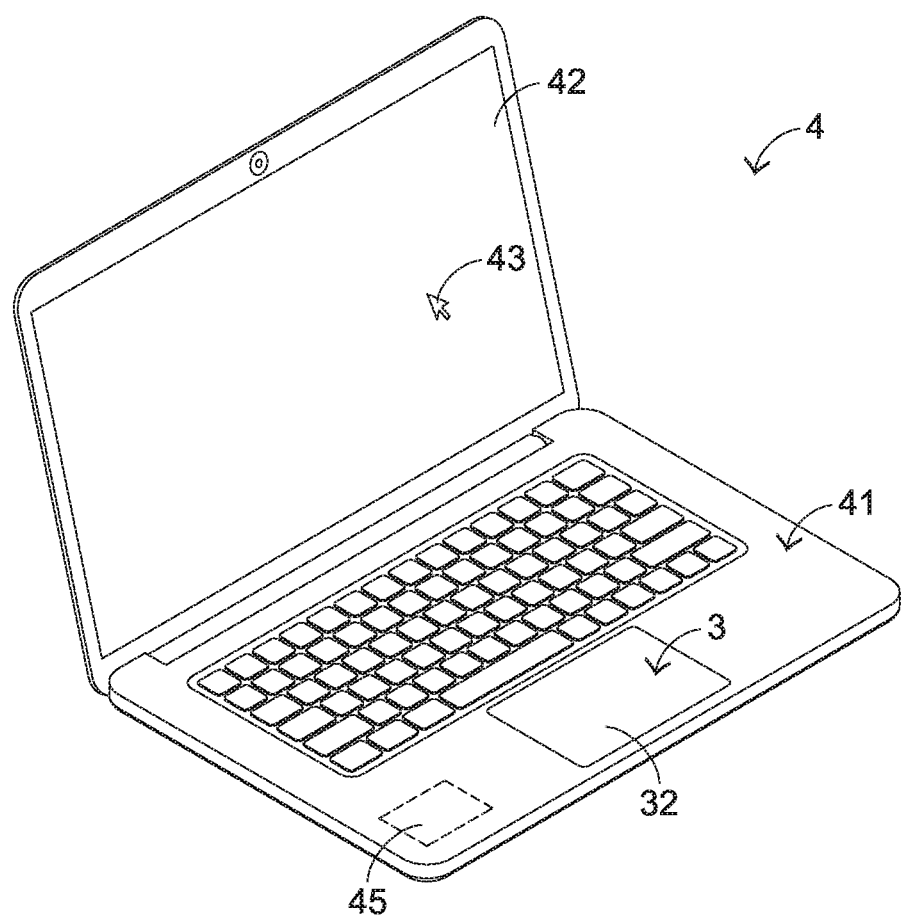
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to a first embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. The processor 41 is used for processing electronic signals of the computing device 4. Moreover, a fixing frame 44 is concavely formed in the casing 41 (see FIG. 5). The touchpad module 3 is disposed within the fixing frame 44 and electrically connected with the processor 45. In addition, at least a portion of the touchpad module 3 is exposed outside so as to be touched by the user's finger. Consequently, the user can operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed down by the user's finger, the computing device 4 executes a specified function.

The other structure of the touchpad module 3 will be described in more details as follows.

Figure 5:
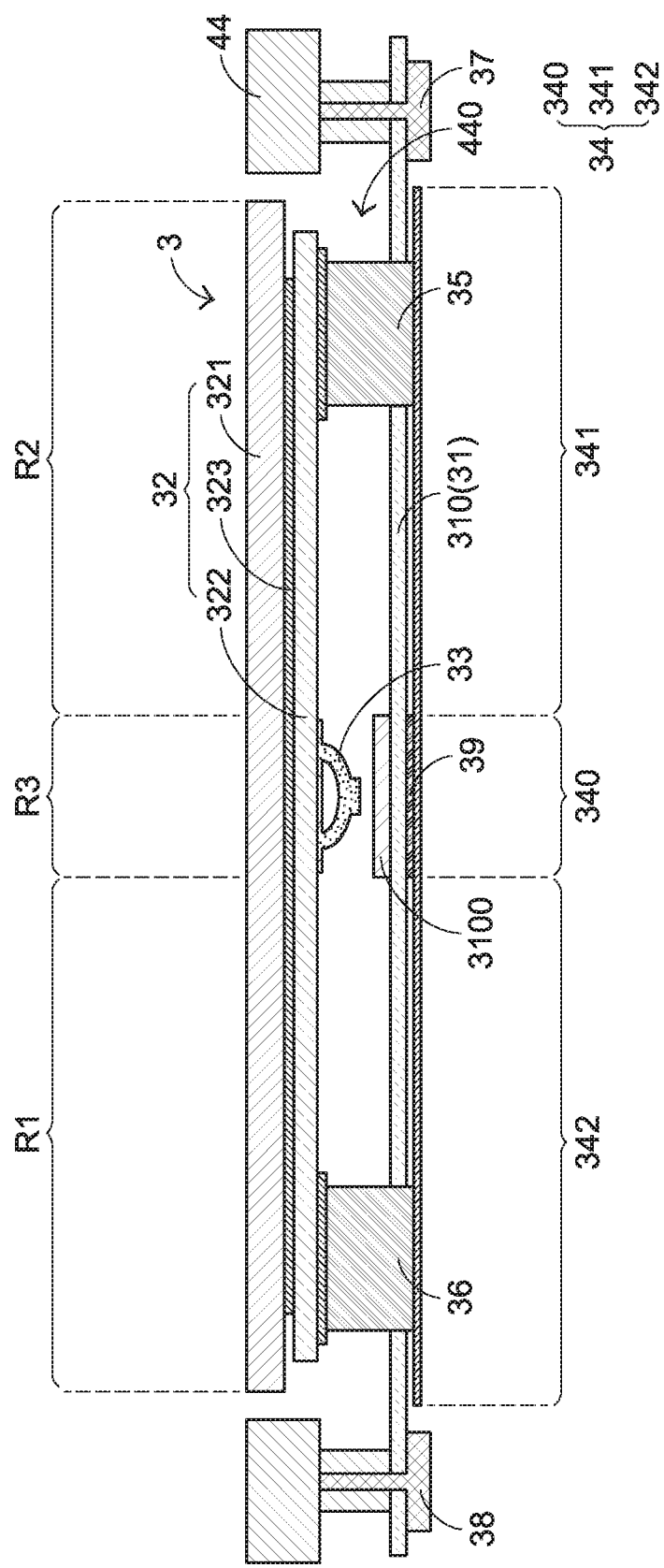
FIG. 5 is a schematic side view illustrating a portion of the touchpad module of the computing device as shown in FIG. 4.
Figure 6:
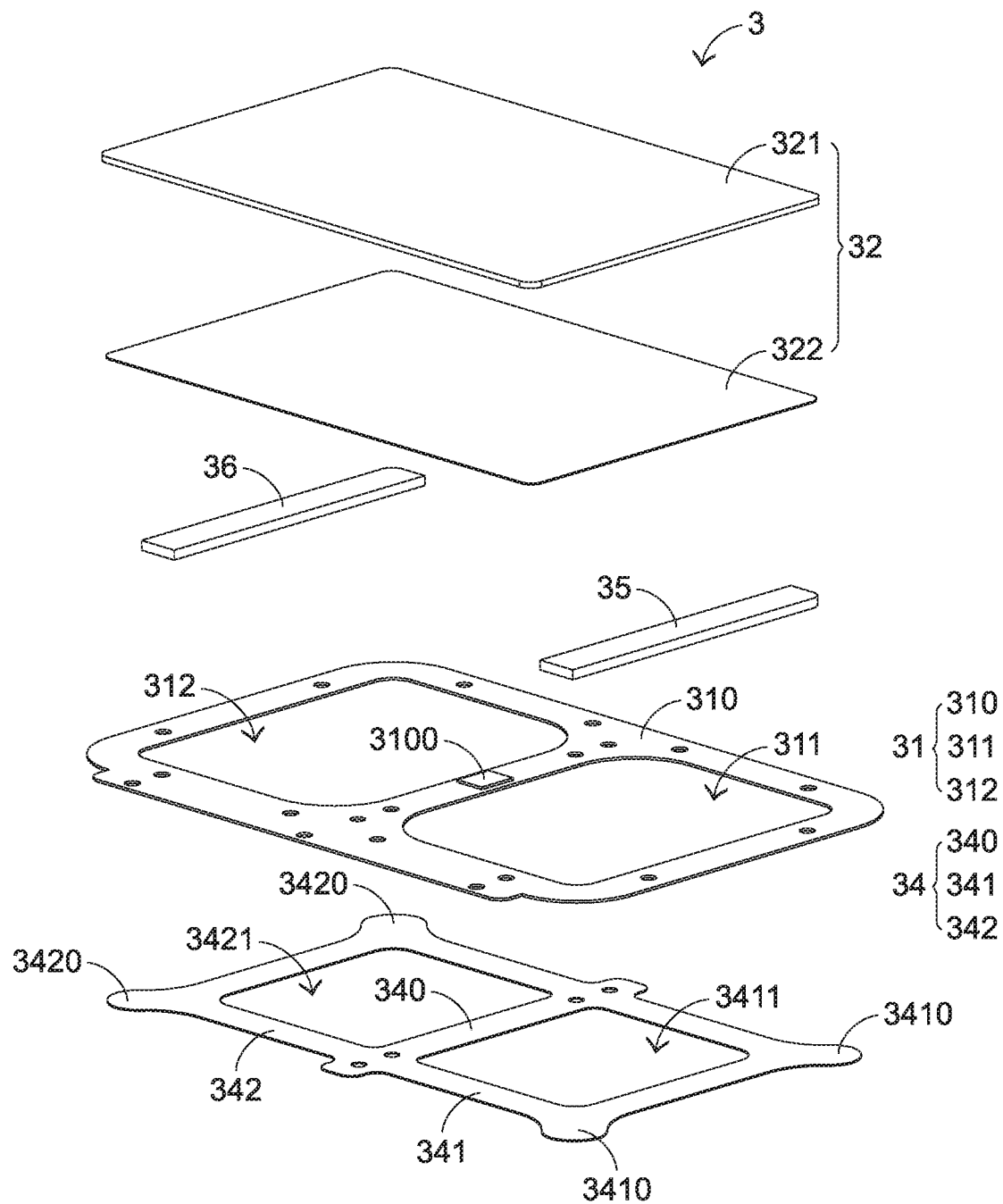
FIG. 6 is a schematic exploded view illustrating the touchpad module as shown in FIG. 5.
Figure 7:
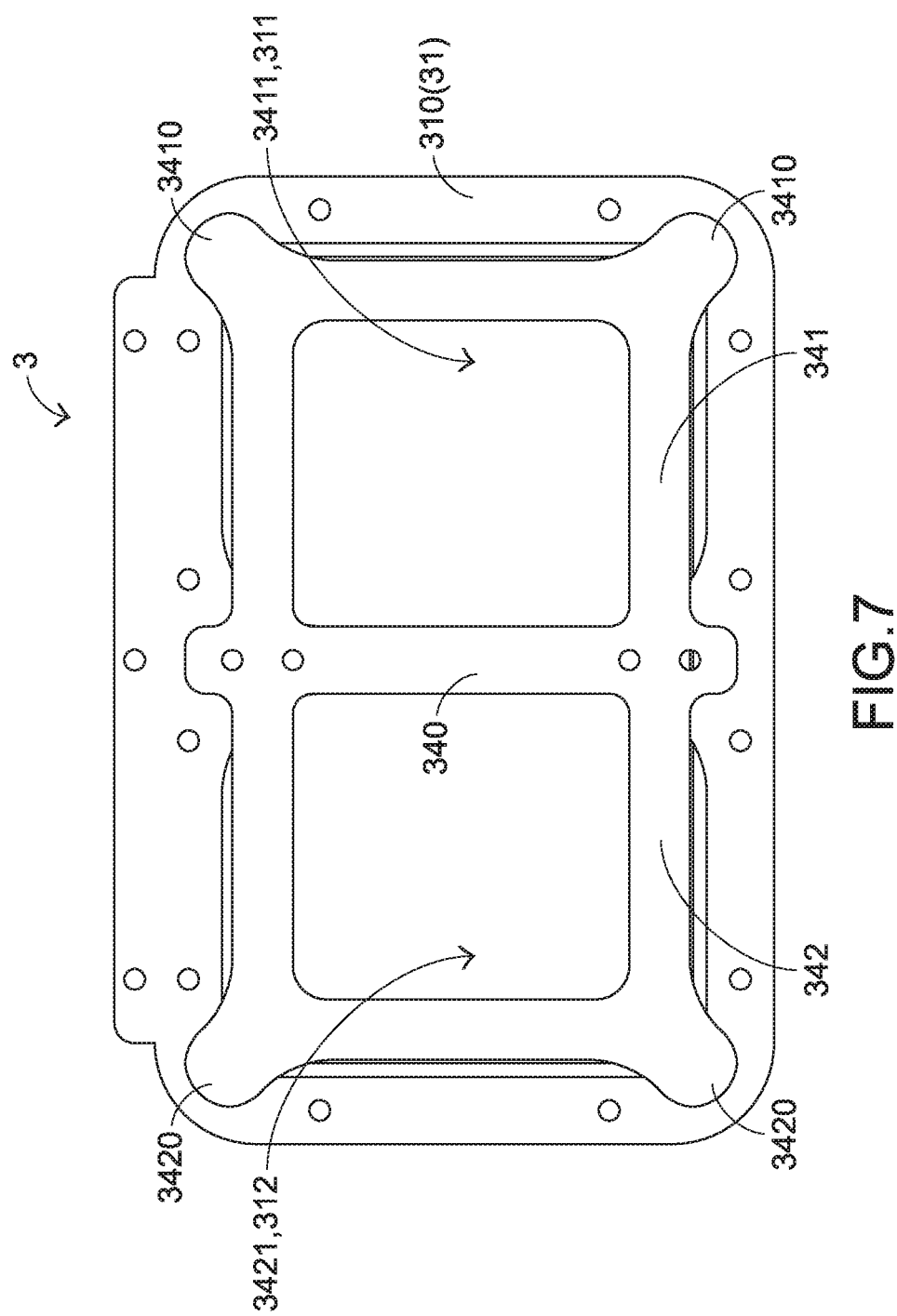
FIG. 7 is a schematic bottom view illustrating the touchpad module as shown in FIG. 5.
Figure 8:
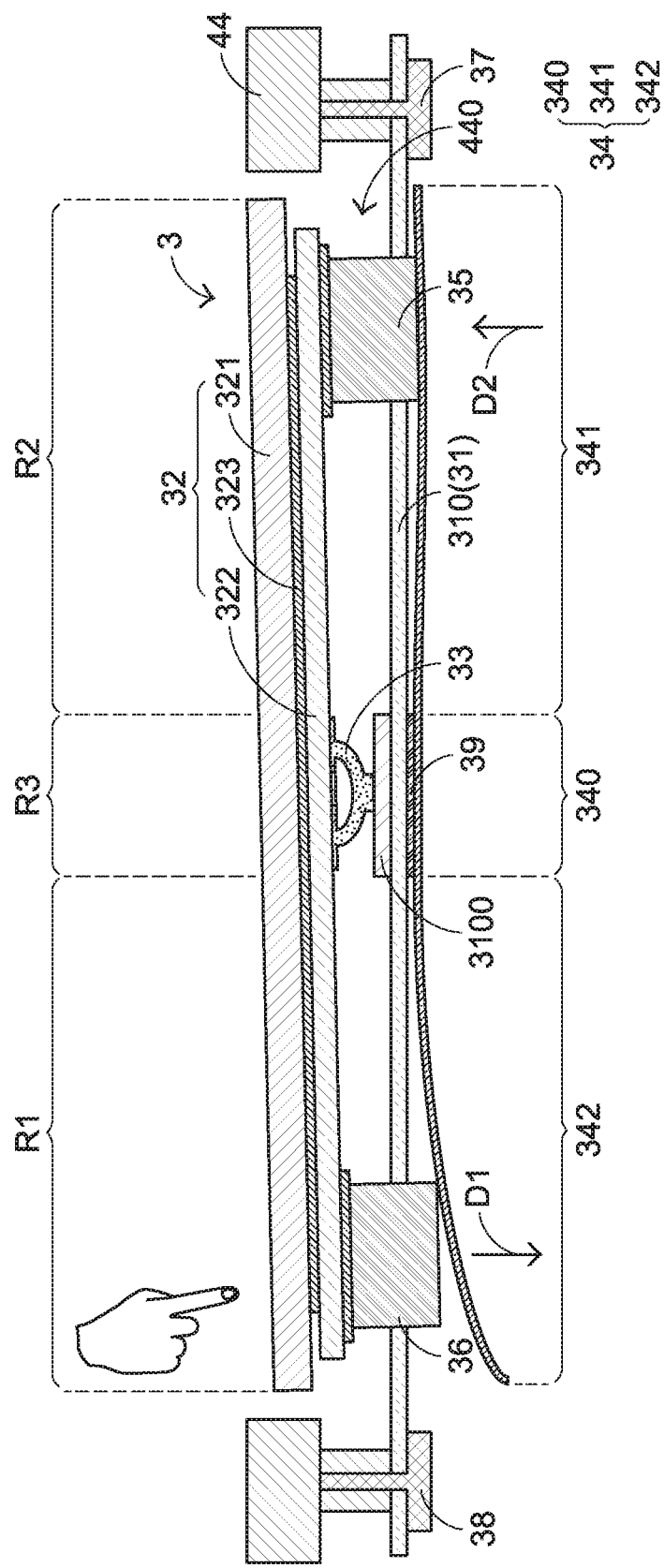
FIG. 8 is a schematic side view illustrating the touchpad module as shown in FIG. 5, in which a first region of the touchpad module is pressed down.
Figure 9:
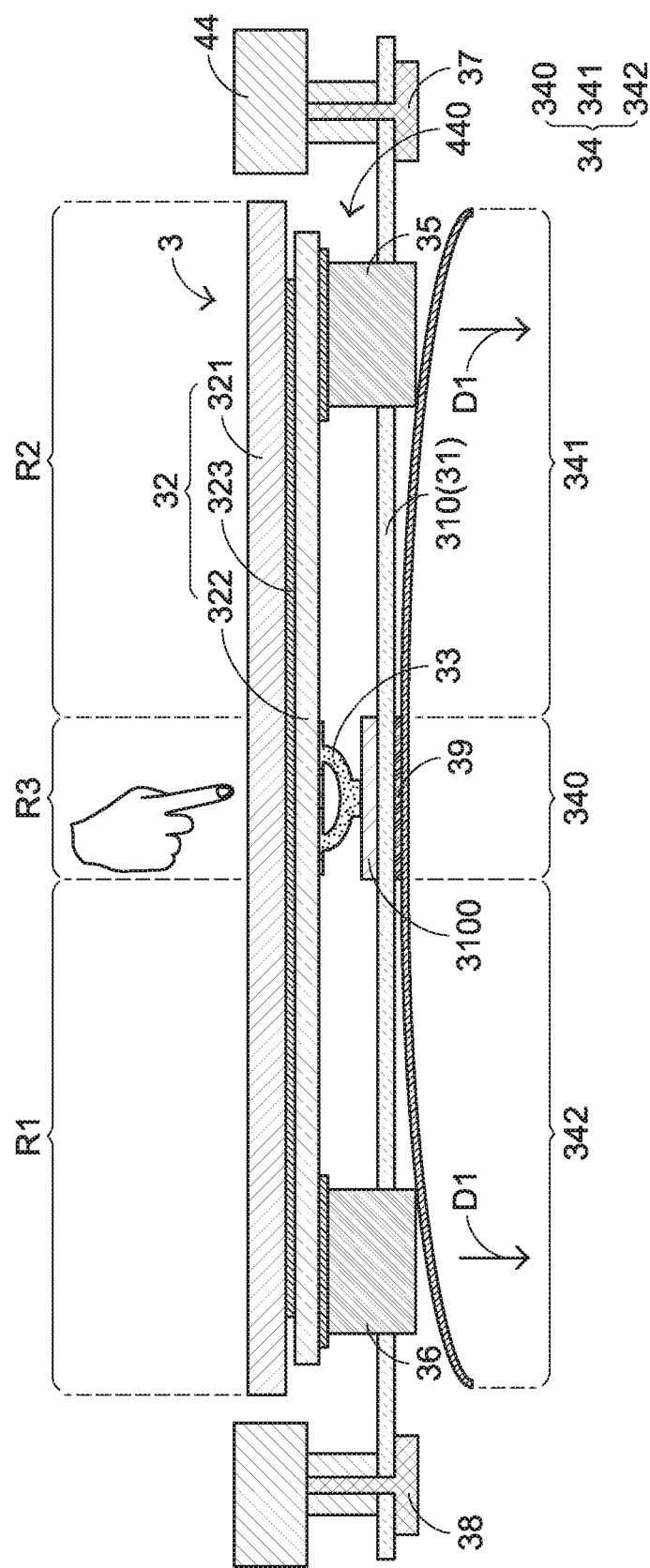
FIG. 9 is a schematic side view illustrating the touchpad module as shown in FIG. 5, in which a third region of the touchpad module is pressed down.

Please refer to FIGS. 5, 6, 7, 8 and 9. FIG. 5 is a schematic side view illustrating a portion of the touchpad module of the computing device as shown in FIG. 4. FIG. 6 is a schematic exploded view illustrating the touchpad module as shown in FIG. 5. FIG. 7 is a schematic bottom view illustrating the touchpad module as shown in FIG. 5. FIG. 8 is a schematic side view illustrating the touchpad module as shown in FIG. 5, in which a first region of the touchpad module is pressed down. FIG. 9 is a schematic side view illustrating the touchpad module as shown in FIG. 5, in which a third region of the touchpad module is pressed down.

As shown in FIGS. 5, 6 and 7, the fixing frame 44 of the computing device 4 comprises an accommodation space 440. The touchpad module 3 is installed within the accommodation space 440. In an embodiment, the touchpad module 3 comprises a base plate 31, a touch member 32, a switch 33, an elastic element 34, a first supporting element 35 and a second supporting element 36.

The base plate 31 comprises a triggering part 3100. The touch member 32 is located over the base plate 31. The switch 33 is disposed on the touch member 32 and aligned with the triggering part 3100 of the base plate 31. The elastic element 34 is located under the base plate 31. Moreover, the elastic element 34 comprises a fixed part 340, a first swingable part 341 and a second swingable part 342. The fixed part 340 of the elastic element 34 is fixed on the base plate 31 and connected between the first swingable part 341 and the second swingable part 342. Preferably but not exclusively, the fixed part 340, the first swingable part 341 and the second swingable part 342 are integrally formed as a one-piece structure. The first swingable part 341 of the elastic element 34 comprises first contact structures 3410. The second swingable part 342 of the elastic element 34 comprises second contact structures 3420. The first contact structures 3410 and the second contact structures 3420 are extended in the directions away from each other. In addition, the first contact structures 3410 and the second contact structures 3420 are contacted with the base plate 31. The first supporting element 35 is installed between the touch member 32 and the first swingable part 341 of the elastic element 34. The second supporting element 36 is installed between the touch member 32 and the second swingable part 342 of the elastic element 34.

Please refer to FIGS. 5, 6 and 7 again. In this embodiment, the base plate 31 comprises a frame body 310, a first hollow portion 311 and a second hollow portion 312. The first hollow portion 311 and the second hollow portion 312 are formed in the frame body 310. The triggering part 3100 of the base plate 31 is disposed on the frame body 310. Particularly, the triggering part 3100 is installed on the region of the frame body 310 between the first hollow portion 311 and the second hollow portion 312. In an embodiment, the first supporting element 35 is penetrated through the first hollow portion 311 of the base plate 31 and contacted with the first swingable part 341 of the elastic element 34, and the second supporting element 36 is penetrated through the second hollow portion 312 of the base plate 31 and contacted with the second swingable part 342 of the elastic element 34. Preferably but not exclusively, the base plate 31 is made of metallic material.

Please refer to FIGS. 5, 6 and 7 again. In an embodiment, the touch member 32 comprises a covering plate 321 and a circuit board 322. The covering plate 321 is located over the circuit board 322. In an embodiment, the covering plate 321 and the circuit board 322 are combined together through an adhesive layer 323. The switch 33 is installed on a bottom surface of the circuit board 322. The bottom surface of the circuit board 322 faces the base plate 31. Preferably but not exclusively, the covering plate 321 is made of glass or any other appropriate material. The material of the covering plate 321 may be varied according to the practical requirements. Preferably but not exclusively, the adhesive layer 323 is made of a pressure sensitive adhesive (PSA) or any other appropriate material. Preferably but not exclusively, the switch 33 is a metal dome.

Please refer to FIGS. 5, 6 and 7 again. In an embodiment, the first swingable part 341 of the elastic element 34 further comprises a third hollow portion 3411, and the second swingable part 342 of the elastic element 34 further comprises a fourth hollow portion 3421. The fixed part 340 of the elastic element 34 is arranged between the third hollow portion 3411 and the fourth hollow portion 3421. The third hollow portion 3411 of the elastic element 34 is in communication with the first hollow portion 311 of the base plate 31. The fourth hollow portion 3421 of the elastic element 34 is in communication with the second hollow portion 312 of the base plate 31. In addition, the fixed part 340 of the elastic element 34 is fixed on the region of the frame body 310 between the first hollow portion 311 and the second hollow portion 312. Particularly, the fixed part 340 of the elastic element 34 is fixed on the region of the frame body 310 between the first hollow portion 311 and the second hollow portion 312 through an adhesive layer 39. Preferably but not exclusively, the adhesive layer 39 is made of a pressure sensitive adhesive (PSA) or any other appropriate material.

In an embodiment, the orthographic projection area of the third hollow portion 3411 on the horizontal plane and the orthographic projection area of the fourth hollow portion 3421 on the horizontal plane are both larger than the orthographic projection area of the fixed part 340 on the horizontal plane. Due to the structural design of the elastic element 34 with the large-area hollow portion, the weight of the touchpad module 3 is largely reduced, and the tactile feel of depressing the touchpad module 3 is enhanced. That is, when the touch member 32 is pressed by the user with a small pressing force, the switch 33 can be triggered.

Please refer to FIGS. 5, 6 and 7 again. In this embodiment, the first swingable part 341 comprises two first contact structures 3410, and the second swingable part 342 comprises two second contact structures 3420. It is noted that the number of the first contact structures 3410 and the number of the second contact structures 3420 are not restricted. That is, the number of the first contact structures 3410 and the number of the second contact structures 3420 may be increased or decreased according to the practical requirements. In this embodiment, the frame body 310 of the base plate 31 has a rectangular structure. It is noted that the appearance and shape of the frame body 310 are not restricted. In this embodiment, the frame body 310 of the base plate 31 has four corners. The two first contact structures 3410 of the first swingable part 341 are located under two corners at the right side of the frame body 310, respectively. The second contact structures 3420 of the second swingable part 342 are located under two corners at the left side of the frame body 310, respectively. That is, the first contact structures 3410 of the first swingable part 341 and the second contact structures 3420 of the second swingable part 342 are respectively contacted with four different corners of the frame body 310.

Please refer to FIGS. 5, 6 and 7 again. The touchpad module 3 further comprises at least one fastening element (e.g., two fastening elements). In this embodiment, the touchpad module 3 comprises a first fastening element 37 and a second fastening element 38. The base plate 31 is fixed on the fixing frame 44 of the computing device 4 through the first fastening element 37 and the second fastening element 38. It is noted that the number of the at least one fastening element is not restricted. That is, the number of the at least one fastening element may be increased or decreased according to the practical requirements.

The operations of the touchpad module 3 will be described in more details as follows.

Please refer to FIGS. 7 and 8. When an external force is exerted on a first region R1 of the touch member 32, the touch member 32 is swung in a first direction D1 by using the first supporting element 35 as a fulcrum. As the touch member 32 is swung toward the base plate 31, the switch 33 on the touch member 32 is contacted with the triggering part 3100 of the base plate 31. Moreover, while the touch member 32 is swung toward the base plate 31, the second supporting element 36 is moved downwardly to push the second swingable part 342 of the elastic element 34. Consequently, the second swingable part 342 of the elastic element 34 is swung in the direction away from the base plate 31 (i.e., in the first direction D1) by using the fixed part 340 of the elastic element 34 as the fulcrum. Moreover, as the second swingable part 342 is swung, the second contact structures 3420 (see FIG. 7) are detached from the base plate 31. Especially, while the second swingable part 342 of the elastic element 34 is swung in the direction away from the base plate 31 (i.e., in the first direction D1) by using the fixed part 340 of the elastic element 34 as the fulcrum, an action force in a second direction D2 is correspondingly generated and exerted on the first swingable part 341 of the elastic element 34. In response to the action force, the first swingable part 341 is swung upwardly. Under this circumstance, the first contact structures 3410 (as shown in FIG. 7) is contacted with the base plate 31 more tightly, and thus a stopping and position-limiting function is provided.

As shown in the FIG. 8, the first region R1 and a second region R2 are respectively located at a first side and a second side of the touch member 32. Consequently, when an external force is exerted on the second region R2 of the touch member 32, the operations of the touch member 32 are similar to those as shown in FIG. 8 except that the second side of the touch member 32 is swung. That is, the touch member 32 is swung in the first direction D1 by using the second supporting element 36 as a fulcrum. As the touch member 32 is swung toward the base plate 31, the switch 33 on the touch member 32 is contacted with the triggering part 3100 of the base plate 31. Moreover, while the touch member 32 is swung toward the base plate 31, the first supporting element 35 is moved downwardly to push the first swingable part 341 of the elastic element 34. Consequently, the first swingable part 341 of the elastic element 34 is swung in the direction away from the base plate 31 (i.e., in the first direction D1) by using the fixed part 340 of the elastic element 34 as the fulcrum. Moreover, as the first swingable part 341 is swung, the first contact structures 3410 (see FIG. 7) are detached from the base plate 31. Especially, while the first swingable part 341 of the elastic element 34 is swung in the direction away from the base plate 31 (i.e., in the first direction D1) by using the fixed part 340 of the elastic element 34 as the fulcrum, an action force in the second direction is correspondingly generated and exerted on the second swingable part 342 of the elastic element 34. In response to the action force, the second swingable part 342 is swung upwardly. Under this circumstance, the second contact structures 3420 (as shown in FIG. 7) is contacted with the base plate 31 more tightly, and thus a stopping and position-limiting function is provided.

As shown in FIGS. 7 and 9, a third region R3 of the touch member 32 is arranged between the first region R1 and the second region R2. When an external force is exerted on the third region R3 of the touch member 32, the touch member 32 is moved toward the base plate 31 (i.e., in the first direction D1). As the touch member 32 is moved toward the base plate 31, the switch 33 on the touch member 32 is contacted with the triggering part 3100 of the base plate 31. Moreover, while the touch member 32 is moved toward the base plate 31, the first supporting element 35 and the second supporting element 36 are moved downwardly to push the first swingable part 341 and the second swingable part 342 of the elastic element 34, respectively. Consequently, the first swingable part 341 and the second swingable part 342 of the elastic element 34 are swung in the direction away from the base plate 31 (i.e., in the first direction D1) by using the fixed part 340 of the elastic element 34 as the fulcrum. Moreover, as the first swingable part 341 and the second swingable part 342, the first contact structures 3410 and the second contact structures 3420 (see FIG. 7) are detached from the base plate 31.

Figure 10:
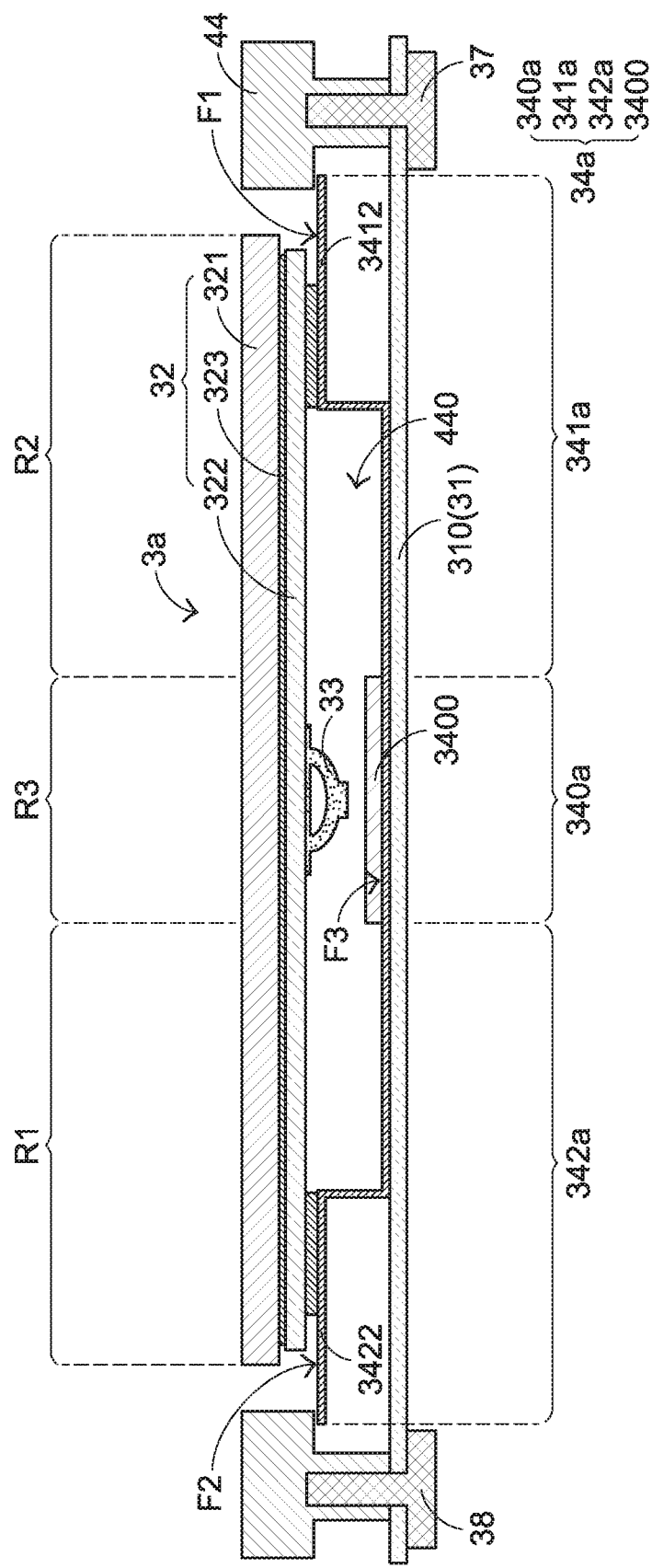
FIG. 10 is a schematic side view illustrating a portion of a touchpad module according to another embodiment of the present invention.
Figure 11:
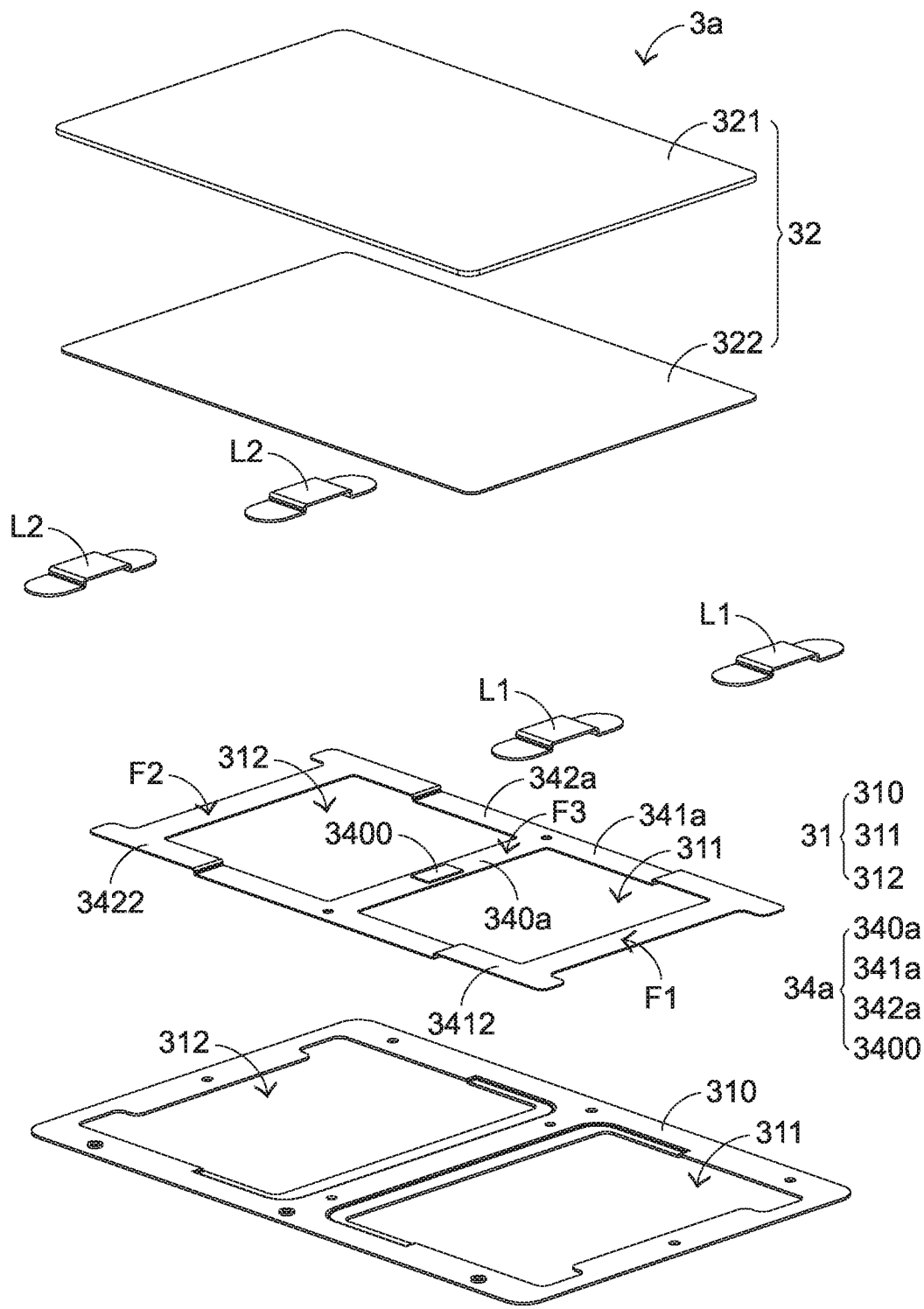
FIG. 11 is a schematic exploded view illustrating the touchpad module as shown in FIG. 10.
Figure 12:
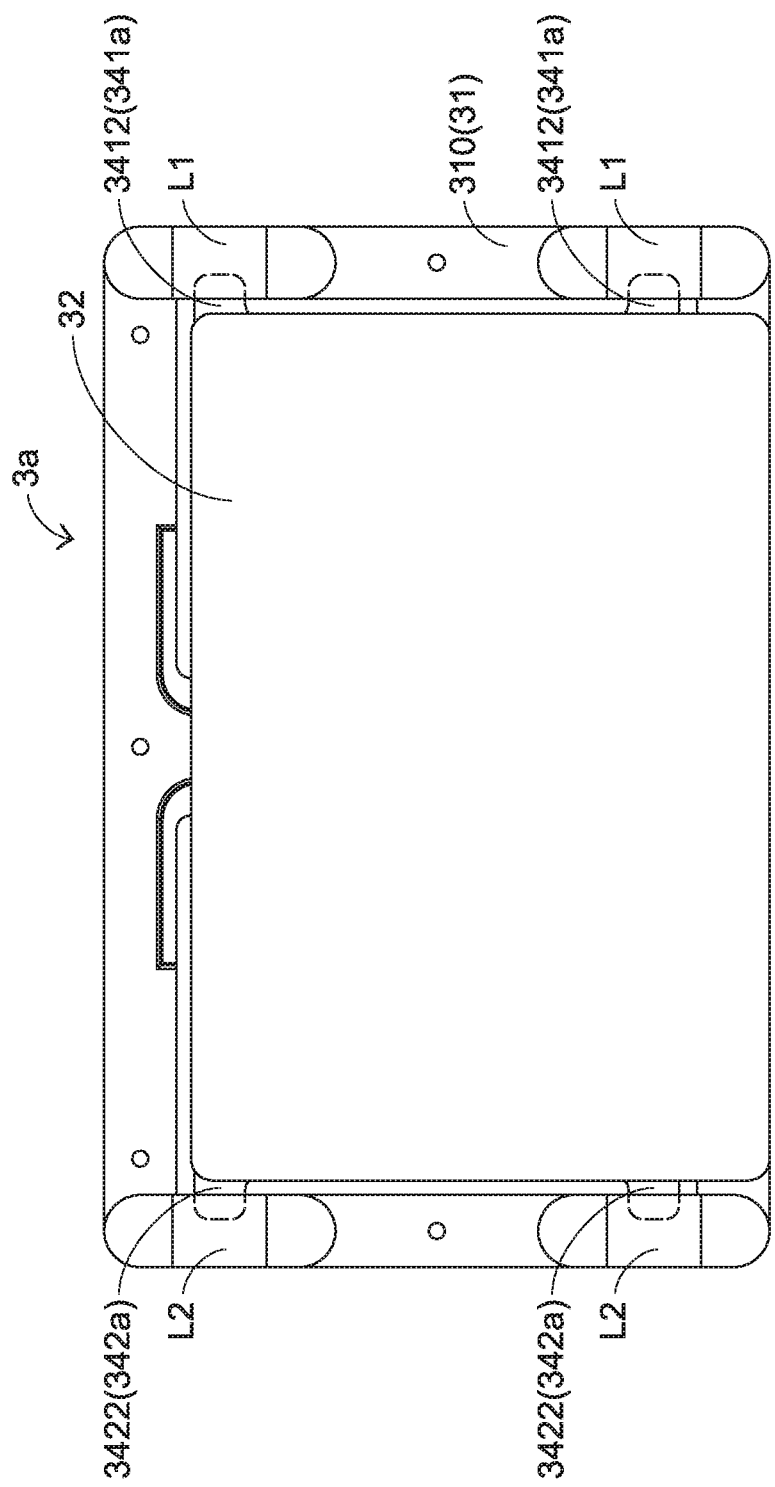
FIG. 12 is a schematic top view illustrating the touchpad module as shown in FIG. 10.
Figure 13:
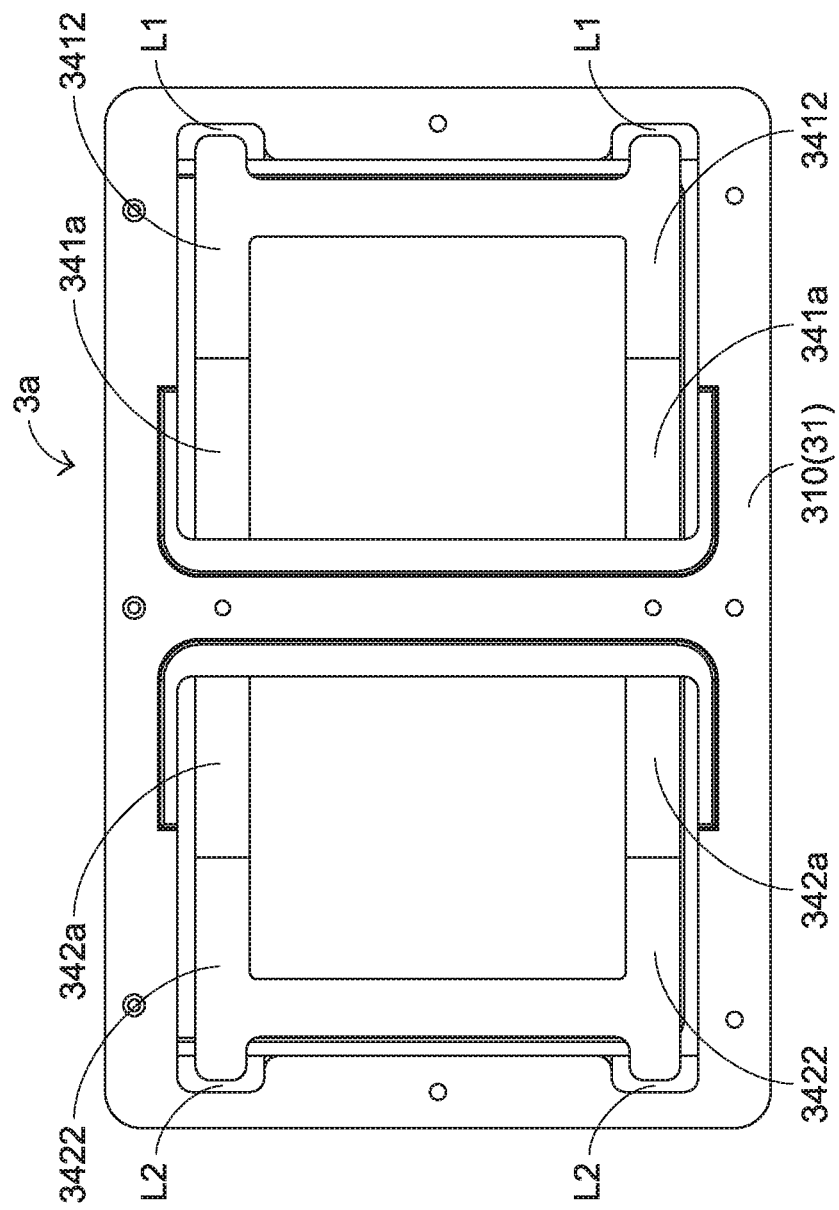
FIG. 13 is a schematic bottom view illustrating the touchpad module as shown in FIG. 10.
Figure 14:
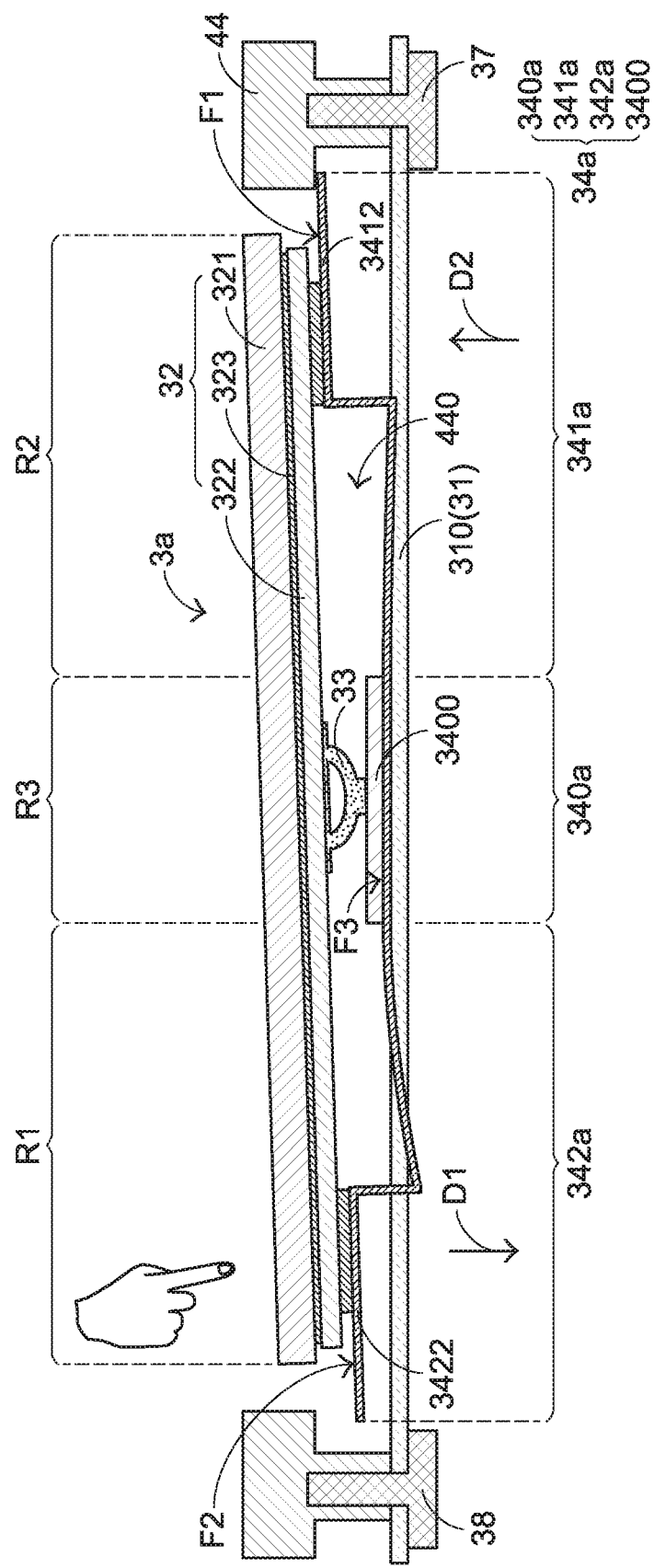
FIG. 14 is a schematic side view illustrating the touchpad module as shown in FIG. 10, in which a first region of the touchpad module is pressed down.
Figure 15:
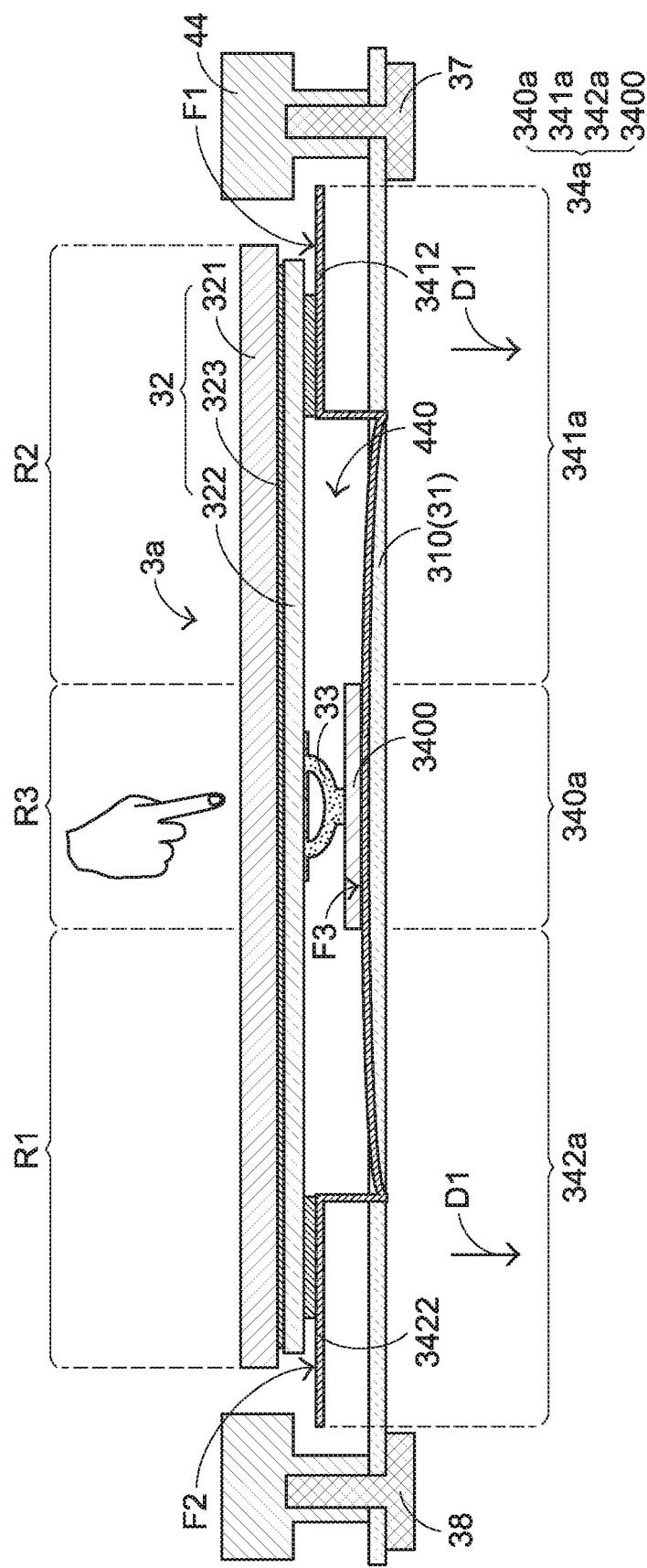
FIG. 15 is a schematic side view illustrating the touchpad module as shown in FIG. 10, in which a third region of the touchpad module is pressed down.

Please refer to FIGS. 10, 11, 12, 13, 14 and 15. FIG. 10 is a schematic side view illustrating a portion of a touchpad module according to another embodiment of the present invention. FIG. 11 is a schematic exploded view illustrating the touchpad module as shown in FIG. 10. FIG. 12 is a schematic top view illustrating the touchpad module as shown in FIG. 10. FIG. 13 is a schematic bottom view illustrating the touchpad module as shown in FIG. 10. FIG. 14 is a schematic side view illustrating the touchpad module as shown in FIG. 10, in which a first region of the touchpad module is pressed down. FIG. 15 is a schematic side view illustrating the touchpad module as shown in FIG. 10, in which a third region of the touchpad module is pressed down.

As shown in FIGS. 10, 11, 12 and 13, the touchpad module 3a is installed within the accommodation space 440 of the fixing frame 44. The structure of the touchpad module 3a is similar to the structure of the touchpad module 3 as shown in FIGS. 5 to 9. In this embodiment, the touchpad module 3a comprises a base plate 31, a touch member 32, a switch 33, an elastic element 34a, first position-limiting elements L1 and second position-limiting elements L2.

The elastic element 34a is arranged between the base plate 31 and the touch member 32. Moreover, the elastic element 34a comprises a fixed part 340a, a first swingable part 341a, a second swingable part 342a and a triggering part 3400. The fixed part 340a of the elastic element 34a is fixed on the base plate 31 and connected between the first swingable part 341a and the second swingable part 342a. Preferably but not exclusively, the fixed part 340a, the first swingable part 341a and the second swingable part 342a are integrally formed as a one-piece structure. The first swingable part 341a of the elastic element 34a comprises first raised support structures 3412. The second swingable part 342a of the elastic element 34a comprises second raised support structures 3422. The first raised support structures 3412 and the second raised support structures 3422 can support the touch member 32. The first raised support structures 3412 and the second raised support structures 3422 are extended in the directions away from each other and exposed outside the touch member 32. The triggering part 3400 is disposed on the fixed part 340a and aligned with the switch 33. The first position-limiting elements L1 are located at a first side of the base plate 31. The portions of the first raised support structures 3412 that are exposed outside the touch member 32 are contacted with the corresponding first position-limiting elements L1. The second position-limiting elements L2 are located at a second side of the base plate 31, which is opposed to the first side of the base plate 31. The portions of the second raised support structures 3422 that are exposed outside the touch member 32 are contacted with the corresponding second position-limiting elements L2.

Please refer to FIGS. 10 and 11. In this embodiment, the first raised support structure 3412 of the first swingable part 341a is raised toward the touch member 32, so that a first surface F1 of the first raised support structure 3412 is contacted with the touch member 32. Moreover, the second raised support structure 3422 of the second swingable part 342a is raised toward the touch member 32, so that a second surface F2 of the second raised support structure 3422 is contacted with the touch member 32. A third surface F3 of the fixed part 340a faces the touch member 32. In this embodiment, the first surface F1 of the first raised support structure 3412 and the third surface F3 of the fixed part 340a are located at different horizontal planes, and the second surface F2 of the second raised support structure 3422 and the third surface F3 of the fixed part 340a are located at different horizontal planes.

Please refer to FIGS. 11, 12 and 13. The first swingable part 341a of the elastic element 34a is included in an orthographic projection region of the first hollow portion 311 of the base plate 31 that faces the first swingable part 341a. Similarly, the second swingable part 342a of the elastic element 34a is included in an orthographic projection region of the second hollow portion 312 of the base plate 31 that faces the second swingable part 342a. In this embodiment, the first swingable part 341a comprises two first raised support structures 3412, and the second swingable part 342a comprises two second raised support structures 3422. It is noted that the number of the first raised support structures 3412 and the number of the second raised support structures 3422 are not restricted. Moreover, the touchpad module 3a comprises at least two first position-limiting elements L1 and at least two second position-limiting elements L2. It is noted that the number of the first position-limiting elements L1 and the number of the second position-limiting elements L2 are not restricted. In this embodiment, the two first raised support structures 3412 of the first swingable part 341a are located beside two corners at the right side of the frame body 310, respectively. The second raised support structures 3422 of the second swingable part 342a are located beside two corners at the left side of the frame body 310, respectively. The two first position-limiting elements L1 are respectively installed on the two corners at the right side of the frame body 310 to cover the corresponding first raised support structures 3412. The two second position-limiting elements L2 are respectively installed on the two corners at the left side of the frame body 310 to cover the corresponding second raised support structures 3422.

The operations of the touchpad module 3a will be described in more details as follows.

Please refer to FIGS. 12, 13 and 14. When an external force is exerted on a first region R1 of the touch member 32, the touch member 32 is swung in a first direction D1 by using the first raised support structures 3412 as a fulcrum. As the touch member 32 is swung toward the base plate 31, the switch 33 on the touch member 32 is contacted with the triggering part 3400 on the fixed part 340a of the elastic element 34, and the second raised support structures 3422 are pushed by the touch member 32. Consequently, the second swingable part 342a of the elastic element 34a is swung toward the base plate 31 (i.e., in the first direction D1)

by using the fixed part 340a of the elastic element 34a as the fulcrum. Moreover, as the second swingable part 342a is swung, the second raised support structures 3422 of the second swingable part 342a (see FIGS. 12 and 13) are detached from the second position-limiting elements L2. Especially, while the second swingable part 342a of the elastic element 34a is swung in the direction toward the base plate 31 (i.e., in the first direction D1) by using the fixed part 340a of the elastic element 34a as the fulcrum, an action force in a second direction D2 is correspondingly generated and exerted on the first swingable part 341a of the elastic element 34a. In response to the action force, the first swingable part 341a is swung upwardly. Under this circumstance, the first raised support structures 3412 (as shown in FIGS. 12 and 13) are contacted with the first position-limiting elements L1 more tightly, and thus a stopping and position-limiting function is provided.

As shown in the FIG. 14, the first region R1 and a second region R2 are respectively located at a first side and a second side of the touch member 32. Consequently, when an external force is exerted on the second region R2 of the touch member 32, the operations of the touch member 32 are similar to those as shown in FIG. 14 except that the second side of the touch member 32 is swung. That is, the touch member 32 is swung in the first direction D1 by using the second raised support structures 3422 as the fulcrum. As the touch member 32 is swung toward the base plate 31, the switch 33 on the touch member 32 is contacted with the triggering part 3400 on the fixed part 340a of the elastic element 34, and the first raised support structures 3412 are pushed by the touch member 32. Consequently, the first swingable part 341a of the elastic element 34a is swung toward the base plate 31 (i.e., in the first direction D1) by using the fixed part 340a of the elastic element 34a as the fulcrum. Moreover, as the first swingable part 341a is swung, the first raised support structures 3412 of the first swingable part 341a (see FIGS. 12 and 13) are detached from the first position-limiting elements L1. Especially, while the first swingable part 342a of the elastic element 34a is swung in the direction toward the base plate 31 (i.e., in the first direction D1) by using the fixed part 340a of the elastic element 34a as the fulcrum, an action force in the second direction D2 is correspondingly generated and exerted on the second swingable part 342a of the elastic element 34a. In response to the action force, the second swingable part 342a is swung upwardly. Under this circumstance, the second raised support structures 3422 (as shown in FIGS. 12 and 13) are contacted with the second position-limiting elements L2 more tightly, and thus a stopping and position-limiting function is provided.

As shown in FIGS. 12, 13 and 15, a third region R3 of the touch member 32 is arranged between the first region R1 and the second region R2. When an external force is exerted on the third region R3 of the touch member 32, the touch member 32 is moved toward the base plate 31 (i.e., in the first direction D1). As the touch member 32 is moved toward the base plate 31, the switch 33 on the touch member 32 is contacted with the triggering part 3400 on the fixed part 340a of the elastic element 34, and the first raised support structures 3412 of the first swingable part 341a and the second raised support structures 3422 of the second swingable part 342a are pushed by the touch member 32. Consequently, the first swingable part 341a and the second swingable part 342a of the elastic element 34a are swung toward the base plate 31 (i.e., in the first direction D1) by using the fixed part 340a of the elastic element 34a as the fulcrum. Moreover, as the first swingable part 341a is swung, the first raised support structures 3412 and the second raised support structures 3422 (see FIGS. 12 and 13) are detached from the first position-limiting elements L1 and the second position-limiting elements L2, respectively.

From the above descriptions, the structure of the touchpad module is specially designed. The whole region of the touch member of the touchpad module can be pressed down. Consequently, the problem of locally pressing the touch member of the conventional touchpad module can be overcome. Moreover, since the structural design of the touchpad module is simplified, the fabricating cost and the overall weight of the touchpad module are reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the touchpad module being installed within a fixing frame of a computing device, the touchpad module comprising:
    a base plate comprising a triggering part;
    a touch member located over the base plate;
    a switch disposed on the touch member and aligned with the triggering part;
    an elastic element located under the base plate, and comprising a fixed part, a first swingable part and a second swingable part, wherein the fixed part is fixed on the base plate and connected between the first swingable part and the second swingable part, the first swingable part comprises at least one first contact structure, and the second swingable part comprises at least one second contact structure, wherein the at least one first contact structure and the at least one second contact structure are extended in directions away from each other, and the at least one first contact structure and the at least one second contact structure are contacted with the base plate;
    a first supporting element installed between the touch member and the first swingable part; and
    a second supporting element installed between the touch member and the second swingable part,
    wherein when an external force is exerted on a first region at a first side of the touch member, the touch member is swung toward the base plate by using the first supporting element as a fulcrum, so that the switch is contacted with the triggering part, wherein while the touch member is swung toward the base plate, the second supporting element is moved downwardly to push the second swingable part, so that the second swingable part is swung away from the base plate and the at least one second contact structure is correspondingly detached from the base plate.

2. The touchpad module according to claim 1, wherein when the external force is exerted on a second region at a second side of the touch member, the touch member is swung toward the base plate by using the second supporting element as the fulcrum, so that the switch is contacted with the triggering part, wherein while the touch member is swung toward the base plate, the first supporting element is moved downwardly to push the first swingable part, so that the first swingable part is swung away from the base plate and the at least one first contact structure is correspondingly detached from the base plate, wherein the first side and the second side of the touch member are two opposite sides of the touch member.

3. The touchpad module according to claim 2, wherein when the external force is exerted on a third region of the touch member between the first region and the second region, the touch member is moved toward the base plate, so that the switch is contacted with the triggering part, wherein while the touch member is moved toward the base plate, the first supporting element and the second supporting element are moved downwardly to push the first swingable part and the second swingable part, respectively, so that the first swingable part and the second swingable part are swung away from the base plate and the at least one first contact structure and the at least one second contact structure are correspondingly detached from the base plate.

4. The touchpad module according to claim 1, wherein the base plate comprises a frame body, a first hollow portion and a second hollow portion, wherein the first hollow portion and the second hollow portion are formed in the frame body, and the triggering part is disposed on the frame body, wherein the first supporting element is penetrated through the first hollow portion and contacted with the first swingable part of the elastic element, and the second supporting element is penetrated through the second hollow portion and contacted with the second swingable part of the elastic element.

5. The touchpad module according to claim 4, wherein the at least one first contact structure comprises plural first contact structures, the at least one second contact structure comprises plural second contact structures, and the frame body of the base plate has a rectangular structure, wherein the plural first contact structures and the plural second contact structures are located under four corners of the rectangular structure, respectively.

6. The touchpad module according to claim 4, wherein the first swingable part of the elastic element further comprises a third hollow portion, the second swingable part of the elastic element further comprises a fourth hollow portion, and the fixed part of the elastic element is arranged between the third hollow portion and the fourth hollow portion, wherein the third hollow portion is in communication with the first hollow portion of the base plate, the fourth hollow portion is in communication with the second hollow portion of the base plate, and the fixed part is fixed on a region of the frame body between the first hollow portion and the second hollow portion.

7. The touchpad module according to claim 1, wherein the touch member comprises a circuit board and a covering plate, wherein the covering plate is located over the circuit board, and the switch is installed on the circuit board.

8. The touchpad module according to claim 1, wherein the touchpad module further comprises at least one fastening element, and the base plate is fixed on the fixing frame through the at least one fastening element.

9. A touchpad module for a computing device, the touchpad module being installed within a fixing frame of a computing device, the touchpad module comprising:
a base plate;
a touch member located over the base plate;
a switch disposed on the touch member;
an elastic element arranged between the base plate and the touch member, and comprising a fixed part, a first swingable part, a second swingable part and a triggering part, wherein the fixed part is fixed on the base plate and connected between the first swingable part and the second swingable part, the first swingable part comprises at least one first raised support structure, and the second swingable part comprises at least one second raised support structure, wherein the touch member is supported by the at least one first raised support structure and the at least one second raised support structure, the at least one first raised support structure and the at least one second raised support structure are extended in directions away from each other and exposed outside the touch member, and the triggering part is disposed on the fixed part and aligned with the switch;
at least one first position-limiting element located at a side of the base plate, wherein a portion of the at least one first raised support structure that is exposed outside the touch member is contacted with the corresponding first position-limiting element; and
at least one second position-limiting element located at another side of the base plate, wherein a portion of the at least one second raised support structure that is exposed outside the touch member is contacted with the corresponding second position-limiting element,
wherein when an external force is exerted on a first region at a first side of the touch member, the touch member is swung toward the base plate by using the first raised support structure as a fulcrum, so that the switch is contacted with the triggering part, wherein while the touch member is swung toward the base plate, the at least one second raised support structure is pushed by the touch member, and the second swingable part is swung toward the base plate, so that the at least one second raised support structure is correspondingly detached from the second position-limiting element.

10. The touchpad module according to claim 9, wherein when the external force is exerted on a second region at a second side of the touch member, the touch member is swung toward the base plate by using the second raised support structure as the fulcrum, so that the switch is contacted with the triggering part, wherein while the touch member is swung toward the base plate, the at least one first raised support structure is pushed by the touch member, and the first swingable part is swung toward the base plate, so that the at least one first raised support structure is correspondingly detached from the first position-limiting element, wherein the first side and the second side of the touch member are two opposite sides of the touch member.

11. The touchpad module according to claim 10, wherein when the external force is exerted on a third region of the touch member between the first region and the second region, the touch member is moved toward the base plate, so that the switch is contacted with the triggering part, wherein while the touch member is moved toward the base plate, the first raised support structure of the first swingable part and the second raised support structure of the second swingable part are pushed by the touch member, and the first raised support structure and the second raised support structure are swung toward the base plate, so that the first raised support structure and the second raised support structure are respectively detached from the first position-limiting element and the second position-limiting element.

12. The touchpad module according to claim 9, wherein the first raised support structure of the first swingable part is raised toward the touch member, so that a first surface of the first raised support structure is contacted with the touch member, wherein the second raised support structure of the second swingable part is raised toward the touch member, so that a second surface of the second raised support structure is contacted with the touch member, wherein a third surface of the fixed part faces the touch member, the first surface and the third surface are located at different horizontal planes, and the second surface and the third surface are located at different horizontal planes.

13. The touchpad module according to claim 9, wherein the base plate comprises a frame body, a first hollow portion and a second hollow portion, wherein the first hollow portion and the second hollow portion are formed in the frame body, the first swingable part of the elastic element is included in an orthographic projection region of the first hollow portion that faces the first swingable part, and the fixed part is fixed on a region of the frame body between the first hollow portion and the second hollow portion.

14. The touchpad module according to claim 13, wherein the at least one first raised support structure comprises plural first raised support structures, the at least one second raised support structure comprises plural second raised support structures, and the frame body of the base plate has a rectangular structure, wherein the plural first raised support structures and the plural second raised support structures are located under four corners of the rectangular structure, respectively.

15. The touchpad module according to claim 14, wherein the at least one first position-limiting element comprises plural first position-limiting elements, the at least one second position-limiting element comprises plural second position-limiting elements, and the plural first position-limiting elements and the plural second position-limiting elements are located under four corners of the rectangular structure, respectively.

16. A computing device, comprising:
a casing, wherein a fixing frame is concavely formed in the casing;
a processor disposed within the casing; and
a touchpad module disposed within the casing and electrically connected with the processor, wherein the touchpad module comprises:
 a base plate comprising a triggering part;
 a touch member located over the base plate;
 a switch disposed on the touch member and aligned with the triggering part;
 an elastic element located under the base plate, and comprising a fixed part, a first swingable part and a second swingable part, wherein the fixed part is fixed on the base plate and connected between the first swingable part and the second swingable part, the first swingable part comprises at least one first contact structure, and the second swingable part comprises at least one second contact structure, wherein the at least one first contact structure and the at least one second contact structure are extended in directions away from each other, and the at least one first contact structure and the at least one second contact structure are contacted with the base plate;
 a first supporting element installed between the touch member and the first swingable part; and
 a second supporting element installed between the touch member and the second swingable part,
 wherein when an external force is exerted on a first region at a first side of the touch member, the touch member is swung toward the base plate by using the first supporting element as a fulcrum, so that the switch is contacted with the triggering part, wherein while the touch member is swung toward the base plate, the second supporting element is moved downwardly to push the second swingable part, so that the second swingable part is swung away from the base plate and the at least one second contact structure is correspondingly detached from the base plate.

17. A computing device, comprising:
a casing, wherein a fixing frame is concavely formed in the casing;
a processor disposed within the casing; and
a touchpad module disposed within the casing and electrically connected with the processor, wherein the touchpad module comprises:
 a base plate;
 a touch member located over the base plate;
 a switch disposed on the touch member;
 an elastic element arranged between the base plate and the touch member, and comprising a fixed part, a first swingable part, a second swingable part and a triggering part, wherein the fixed part is fixed on the base plate and connected between the first swingable part and the second swingable part, the first swingable part comprises at least one first raised support structure, and the second swingable part comprises at least one second raised support structure, wherein the touch member is supported by the at least one first raised support structure and the at least one second raised support structure, the at least one first raised support structure and the at least one second raised support structure are extended in directions away from each other and exposed outside the touch member, and the triggering part is disposed on the fixed part and aligned with the switch;
 at least one first position-limiting element located at a first side of the base plate, wherein a portion of the at least one first raised support structure that is exposed outside the touch member is contacted with the corresponding first position-limiting element; and
 at least one second position-limiting element located at a second side of the base plate, wherein a portion of the at least one second raised support structure that is exposed outside the touch member is contacted with the corresponding second position-limiting element,
 wherein when an external force is exerted on a first region at a first side of the touch member, the touch member is swung toward the base plate by using the first raised support structure as a fulcrum, so that the switch is contacted with the triggering part, wherein while the touch member is swung toward the base plate, the at least one second raised support structure is pushed by the touch member, and the second swingable part is swung toward the base plate, so that the at least one second raised support structure is correspondingly detached from the second position-limiting element.

* * * * *